Sept. 12, 1961 P. J. DRYER ET AL 2,999,911

DIRECTION SIGNALING APPARATUS

Filed March 4, 1959 3 Sheets-Sheet 1

INVENTORS
PETER J. DRYER
DOUGLAS C. HARDING

BY *Learman, Learman & McCulloch*

ATTORNEYS

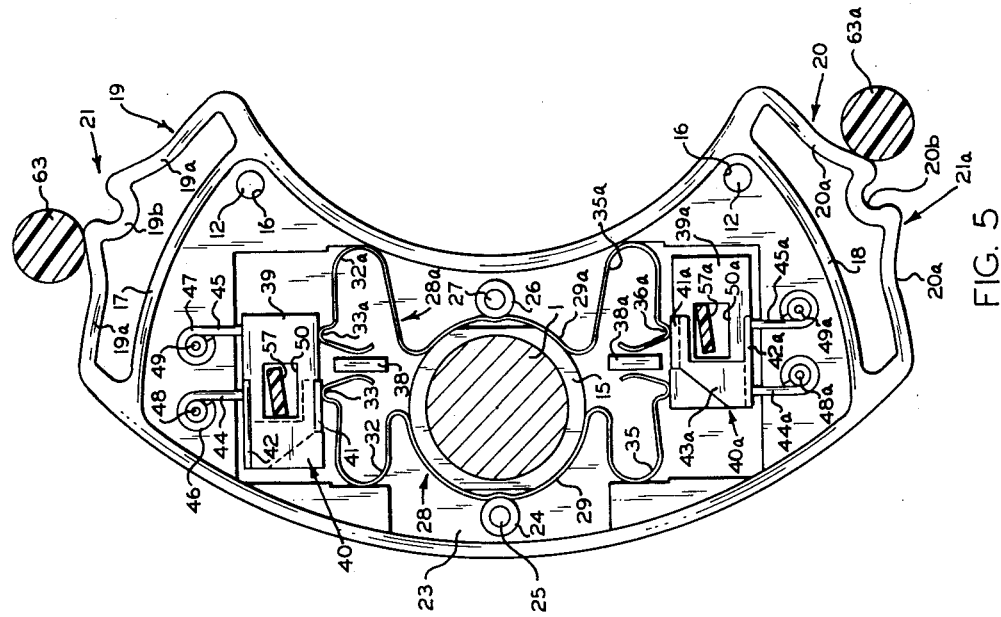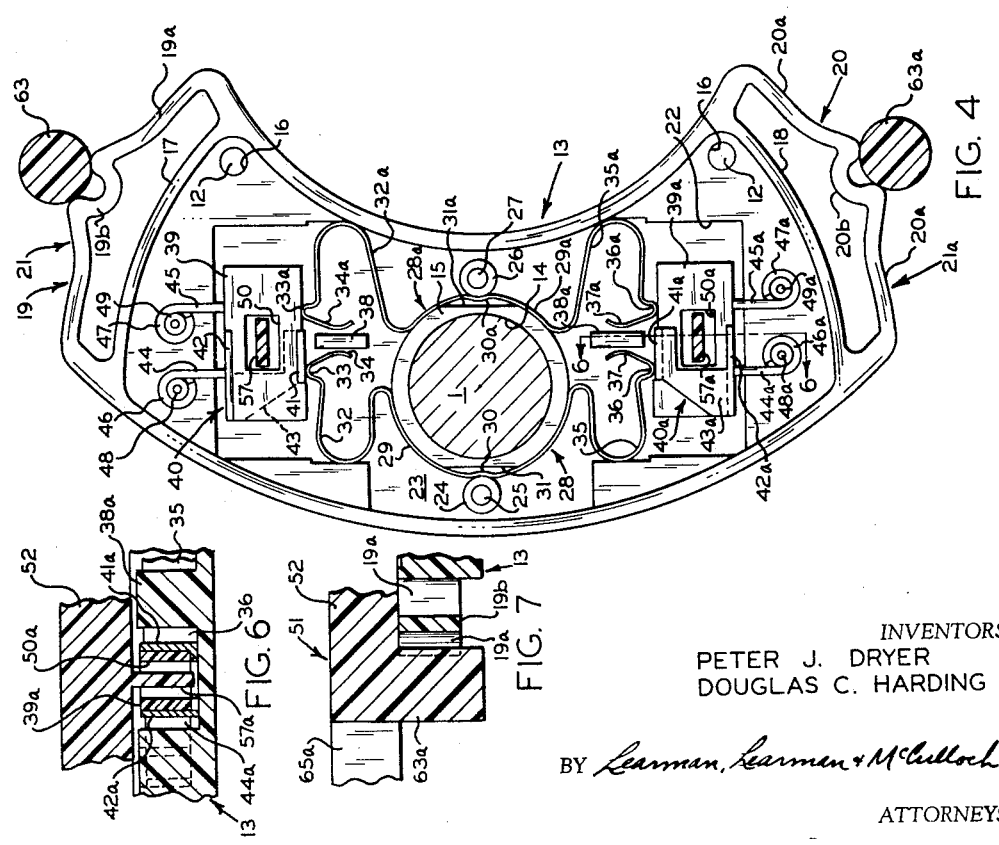

Sept. 12, 1961 P. J. DRYER ET AL 2,999,911
DIRECTION SIGNALING APPARATUS
Filed March 4, 1959 3 Sheets-Sheet 3

INVENTORS
PETER J. DRYER
DOUGLAS C. HARDING

BY Learman, Learman & McCulloch
ATTORNEYS

United States Patent Office 2,999,911
Patented Sept. 12, 1961

2,999,911
DIRECTION SIGNALING APPARATUS
Peter J. Dryer, Boyne City, and Douglas C. Harding, Ann Arbor, Mich.; said Dryer assignor to Boyne Products, Inc., Boyne City, Mich., a corporation of Michigan, and said Harding assignor to Don R. Ford Associates, Inc., Detroit, Mich., a corporation of Michigan
Filed Mar. 4, 1959, Ser. No. 797,266
9 Claims. (Cl. 200—61.34)

This invention relates to directional signaling apparatus of the kind adapted for use in conjunction with the lighting system and steering mechanism of a motor vehicle and which is capable of being set manually to indicate either a left hand or right hand turn and being automatically returnable to a neutral position upon the completion of a turn.

Apparatus of the class to which the invention pertains is in general use on motor vehicles and may be classified both as a convenience to the vehicle operator and as a safety device in that it serves to inform the drivers of other vehicles of a change in direction of the vehicle equipped with the turn signaling mechanism. Apparatus of the kind predominantly in use utilizes certain lights with which a vehicle is equipped and is electromechanical in nature. An acceptable turn signaling device, therefore, must be adapted for use with the normal lighting system of the vehicle without interfering with the normal operation of the lights in either the active or inactive position of the signaling device. To provide such signaling apparatus is one object of this invention.

A turn signal device is operated usually only just before and during turning of a vehicle, so care must be taken in constructing the electrical parts of the apparatus in such manner as to insure perfect electrical operation of the apparatus every time. One of the difficulties with known apparatus lies in providing good wiping characteristics to the current conducting elements of the switch parts to maintain the surfaces of the conducting elements clean and bright and thereby assure good electrical contact. Another object of this invention, therefore, is to provide improved switch means for direction signaling apparatus wherein the movable current conducting elements have excellent wiping characteristics.

It has been customary, heretofore, in the manufacture of turn signal devices to rely at least partly upon opposing spring forces for the operation of the devices. The use of opposed springs presents many problems, such as the balancing of forces and, in addition, are rather difficult to assemble, especially where the parts with which they are assembled are relatively small and light. Another object of the invention, therefore, is the provision of direction signaling apparatus wherein springs as such may be eliminated altogether or, if used, do not require being arranged to oppose one another.

The great majority of signaling devices currently in use are composed of a fairly large number of separately fabricated parts, thereby necessitating the expenditure of considerable time and money in the manufacture and assembly of the parts. Another object of this invention is to provide a turn signal mechanism composed of relatively few separate parts and in which other parts are consolidated in a few single structural members so as to minimize the expense of manufacture and reduce the time of assembly.

Other objects and advantages of the invention will be pointed out specifically or will become apparent from the following description when it is considered in conjunction with the appended claims and the accompanying drawings, in which:

FIGURE 4 is an enlarged, plan view of the switch mechanism with parts of the switch operating apparatus shown in section, the parts shown in FIGURE 4 being in the positions they occupy when the signaling mechanism is in its neutral position;

FIGURE 5 is a view similar to to FIGURE 4, but showing the parts in the positions they occupy when indicating a turn;

Figure 1:
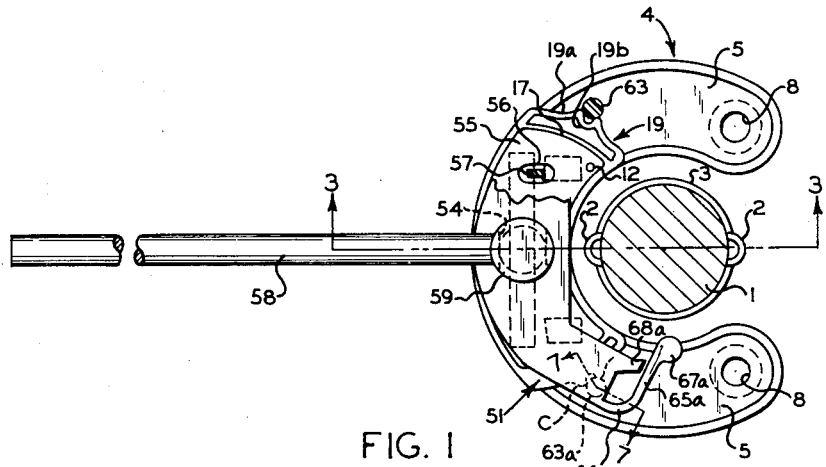
FIGURE 1 is a fragmentary view, partly in plan and partly in section, of apparatus constructed and installed in accordance with the invention, the apparatus being in its neutral or inactive position.
Figure 9:
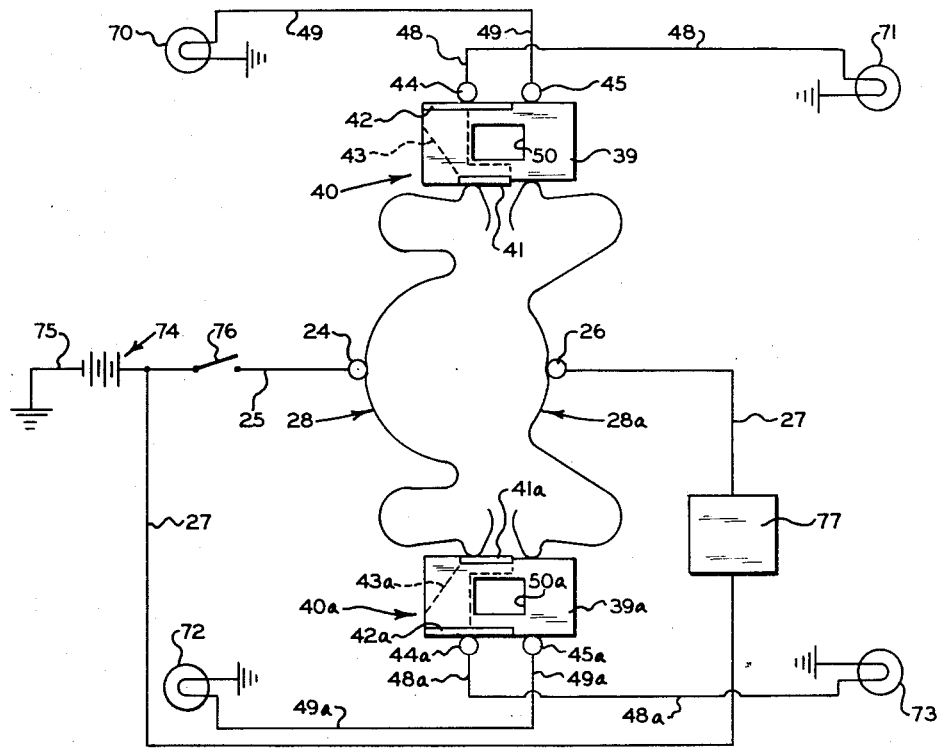
Figure 8:
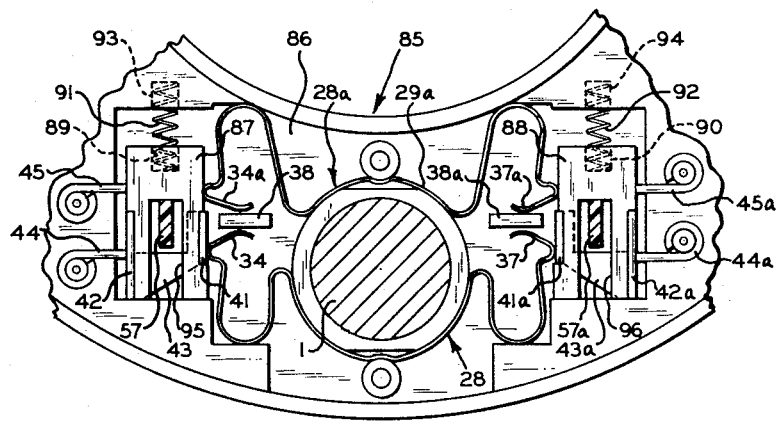

FIGURES 6 and 7 are sectional views along the lines 6—6 and 7—7, respectively, of FIGURES 1 and 4;

FIGURE 8 is a view similar to FIGURE 4, but illustrating a modified form of the invention; and FIGURE 9 is a schematic wiring diagram.

Apparatus constructed in accordance with one embodiment of the invention is adapted for use in conjunction with a motor vehicle having steering mechanism including a rotatable steering post 1 connected at one end to a steering wheel (not shown) and at its other end to apparatus for effecting turning of the front wheels of a vehicle. Mounted on a selected part of the steering apparatus, such as the steering post 1, is one or more cams 2 which are carried by a band 3 and project radially from the post 1 for movement in an orbital path upon rotation of the steering post. The cams 2 need not necessarily be mounted on the post 1. Many automobile manufacturers utilize steering wheels having similar cams connected to and projecting from the hub of the steering wheel, and the invention is equally adapted for use with constructions of this kind.

Figure 3:
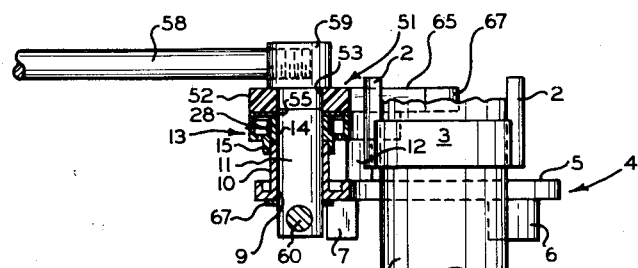
FIGURE 3 is a sectional view taken on the line 3—3 of FIGURE 1.

Apparatus formed in accordance with the invention includes a support 4 comprising a generally C-shaped plate 5 adapted to embrace the steering post 1 in the region of the cams 2. The lower surface of the plate 5 may be equipped with supporting lugs or feet 6 and 7, the lugs 6 being apertured as at 8 for reception of screws (not shown) by means of which the support may be anchored to a housing (not shown) surrounding the steering post 1. At its central portion, the plate 5 is bored as at 9 and surmounted by a boss 10 forming a hub in which is journaled an operating rock shaft 11. The upper surface of the plate 5 also is provided with a pair of upstanding locating pins, one of which is shown at 12 in FIGURE 3, for a purpose presently to be explained.

The invention includes an arcuate switch housing or case 13 formed on an arc corresponding substantially to the arc of the plate 5 and provided with a central opening 14 surmounted by a hub 15 which rotatably receives the operating shaft 11. The body of the housing 13 is pierced in two places to provide openings 16 located in such positions as to receive the locating pins 12 and prevent rotation of the housing 13 relative to the support 4.

The switch case 13 preferably is molded from a plastic material such as nylon which is both electrically insulating and resilient. The body proper of the molded case 13 terminates in end walls 17 and 18, but from the respective ends of the body proper extend integral, flexible walls or ribs 19 and 20, with which the end walls 17 and 18 form a pair of closed loops. The wall 19 comprises a pair of portions 19a converging towards one another along curved lines and being joined to one another by an integral, reversely directed half-loop portion 19b. The wall 20 is formed of similar portions 20a and 20b.

The walls 19 and 20 form parts of detent mechanism 21 and 21a, the function and operation of which will be described hereinafter.

The central portion of the housing 13 is recessed as at 22 so as to provide a relatively large chamber 23 of generally rectangular configuration (see FIGURES 4 and 5). The floor of the chamber is pierced adjacent to the hub 15 for reception of a fixed contact post 24 in which is clamped a wire 25 which is connected to a source of continuous or steady energy in a manner which will be explained hereafter. At a point diametrically opposed to the post 24, the floor of the chamber 23 is pierced for reception of a similar fixed post 26 in which is clamped a wire 27 that is connected to a source of intermittent power in a manner which also will be explained subsequently. Associated with the post 24 is a flat, resilient, electrically conductive member 28 preferably formed of a beryllium copper alloy and having a central section 29 which embraces the hub 15 so as to center the member 28 between the ends of chamber 23. The central part of the arcuate portion 29 engages the post 24 and to insure snug engagement therebetween the relative sizes and locations of the post 24 and the hub 15 are such that the arcuate portion 29 will be crimped as at 30 upon assembly of the parts. In order to provide space to accommodate the crimped portion 30, the hub 15 may be flattened as at 31.

At one end of the arcuate portion 29 is integrally joined a half-loop portion 32 forming a resilient supporting arm for a laterally projecting contact portion 33 which terminates in a reversely projecting guide finger 34. The other end of the arcuate portion 29 is joined to a similar half-loop portion 35 forming a resilient supporting arm for a laterally bent contact portion 36, the latter also terminating in a reversely directed guide finger 37.

Associated with the contact post 26 is an electrically conductive member 28a which is substantially identical to the member 28 and has parts corresponding to the latter identified by the same reference characters, follower by the suffix a. The construction and arrangement of the members 28 and 28a are such that the ends of the loop portions engage the corresponding sides of the recess 22 to assist in locating the members and preventing any tendency of the members to slide or rotate upon the hub 15. The members 28 and 28a are intended to conduct electrical energy of two different kinds, and to prevent any possibility of one of the members 28 or 28a contacting the other, the case 13 is provided with a pair of insulating posts 38 and 38a formed integrally with the case and extending upwardly from the floor of the chamber 23 and located in a position to be interposed between the guide fingers of the respective members 28 and 28a.

Means for transmitting electrical energy from a selected member 28 or 28a comprises a block or slide 39 mounted in the recess 23 adjacent to one end of the latter and preferably being molded of insulating material such as nylon. A generally saddle-shaped, three-sided current conducting element 40 embraces three sides of the block 39 and comprises a pair of parallel legs 41 and 42 spaced from one another by a web portion 43. The element 40 may be secured to the block 39 in any convenient manner, but for convenience in assembling, the sides of the block are provided with notches in which the parallel sides 41 and 42 are received. The legs 41 and 42 are not of equal length, for a reason which presently will appear, and the shorter leg 41 is so arranged as to face the contact portions 33 and 33a of the current conducting members 28 and 28a, respectively. The longer leg 42 faces the end wall of the chamber 23 and is adapted to contact rigid fingers 44 and 45 formed of electrically conducting material and forming integral parts of contact posts 46 and 47 in which are clamped wires 48 and 49, respectively. As is best shown in FIGURES 4 and 5, the block 39 is substantially shorter in length than the portion of the chamber 23 in which it is received, thereby enabling the block 39 to be shifted to and fro from its position as shown in FIGURE 4. The block 39 is provided with a central opening 50 for cooperation with means yet to be described which is capable of effecting sliding movements of the block.

The opposite end of the recess 23 is equipped with apparatus identical to that just described and corresponding parts are identified by the same reference characters, followed by the suffix a. It is important to note, however, that the shorter leg 41a of the current conducting element 40a again faces inwardly of the chamber 23. This may be accomplished by placing the block 39a in the chamber 23 in a position upside down as compared to the block 39. It also is important to note that the positions of the current conducting elements 40 and 40a are such that their respective shorter legs 41 and 41a both engage the member 28, while the respective longer legs 42 and 42a engage only the corresponding contact fingers 44 and 44a when the blocks 39 and 39a are in their neutral positions as shown in FIGURE 4.

Means for operating the parts of the switch mechanism comprises a generally C-shaped actuating member 51 (see FIGURES 1, 2 and 3) having a central web or body portion 52 provided with an opening 53 which receives the upper end of the operating shaft 11. The upper end of the shaft 11 is flattened and opposite sides of the opening 53 are similarly flattened as at 54 so as to key the actuating member 51 to the shaft 11 for rocking movement with the latter about the axis of the shaft. To provide a smooth surface between the superposed parts 13 and 51 and to prevent the entry of foreign matter to the interior of the switch housing 13, the latter is provided with a cover plate 55 having openings 56 spaced according to the openings 50 and 50a in the respective slide blocks 39 and 39a.

The actuating member 51 preferably is molded from nylon and includes a pair of downwardly projecting, integral pawls or fingers 57 and 57a (see FIGURES 1 and 6) which are so located as to be received in the openings 50 and 50a formed in the respective slide blocks 39 and 39a. As will be apparent from FIGURES 1, 4 and 5, the fingers 57 and 57a are located on opposite sides of the axis of rotation of the member 51 so that rotation of the latter will effect movement of the blocks 39 and 39a simultaneously in opposite directions.

Rocking movement may be imparted to the actuating member 51 by means of an operating lever 58 secured at one end to an enlarged head 59 forming part of the operating shaft 11. The head 59 overlies the upper surface of the actuating member 51 and thus prevents the shaft 11 from dropping out of the assembly. The lower end of the shaft 11 has a pin 60 extending therethrough which bears against a washer 61 to prevent inadvertent withdrawal of the shaft 11 from the assembly. The pin 60 is of such length as to engage each of the lugs 7, depending on the direction of rotation of the shaft 11, and thus serves to limit rocking movement of the lever 58 and the actuating member 51 is both directions from their neutral positions.

Means is provided for holding the actuating member 51 in any of its positions of adjustment and comprises a pair of detent posts or pins 63 and 63a depending from the lower surface of the actuating member 51 and molded integrally with the latter. The pin 63 is so located that, when the parts are in assembled relation, it bears snugly against the flexible rib 19 of the detent 21 and the pin 63a is spaced to bear against the similar flexible rib 20 of the detent 21a. The arrangement of the pins 63 and 63a is such that, when the actuating member is in its neutral position, as shown in FIGURES 1 and 4, the pins 63 and 63a will be opposite the rib portions 19b and 20b, respectively, and those rib portions will be somewhat depressed by the pins so as yieldably to maintain the member 51 in its neutral position. When the lever 58 is operated to shift the actuating member 51 to a turn indicating position, as is shown in FIG-URES 2 and 5, the pins 63 and 63a will move in opposite directions to one side of the portions 19b and 20b, respectively. This will permit the walls 19 and 20 to flex outwardly and yieldably hold the actuating member in its turn indicating position.

The invention includes return or canceling means 64 and 64a operable automatically upon the completion of a turn to restore the actuating member and the switch mechanism to their neutral positions. The return means comprises a pair of resilient fingers 65 and 65a located one at each terminal end of the body portion of the actuating member 51 and formed integrally with the latter by the same molding process that forms the member 51. The finger 65 is curved as at 66 to project towards the steering post 1 and terminates in an enlarged, smoothly rounded knob 67 adapted for engagement by the cams 2. The return means 64 also includes an integral abutment 68 projecting from the body of the end of the actuating member 51 towards the arm 65, but being slightly spaced from the latter when the parts are in their neutral positions. The parts constituting the mechanism 64a are identical to the parts of the mechanism 64 and are identified by the same reference characters, followed by the letter a.

In the operation of the parts described thus far and when no turn is being indicated, the operating lever 58 will be in its neutral position so that the other parts will occupy the positions shown in FIGURES 1 and 4. In these positions of the parts, the canceling fingers 65 and 65a are located out of the path of movement of the cams 2. Therefore, the steering post 1 may be rotated at will without effecting any change in the positions of the parts of the signaling apparatus.

Figure 2:
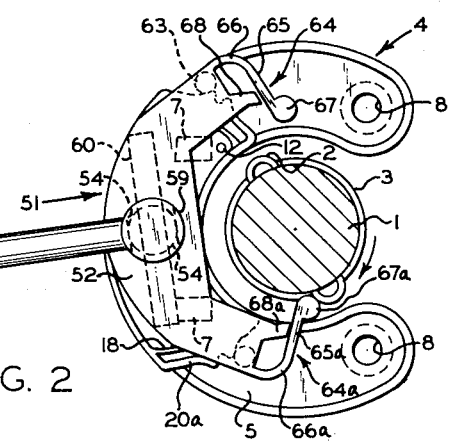
FIGURE 2 is a view similar to FIGURE 1, but showing the parts of the apparatus moved to indicate a turn and about to be restored to their neutral positions.

When it is desired to indicate a left hand turn, for example, the operating lever 58 may be moved manually in a counterclockwise direction to the position shown in FIGURE 2 whereupon the actuating member 51 and its associated parts will also be rocked counterclockwise and locate the switch parts in the positions shown in FIGURE 5. At the same time, the canceling finger 65a will be moved so that its end 67a will be projected into the path of movement of the cams 2, but because of the resilience of the finger 65a and the location of the reinforcing post 68a, the steering shaft 1 may be rotated in a counterclockwise direction as long as desired without affecting the position of the actuating member 51. This is due to the fact that the arm 65a offers little resistance to counterclockwise rotation of the shaft 1 and may be cammed out of the path of each of the cams 2. The resilience of the arm 65a, however, will restore the end 67a to its position in the path of the cams immediately after the end 67a is released by a cam.

When the actuating member and its associated parts have been rocked to the positions shown in FIGURE 2, the switch block 39 will have been moved to the position shown in FIGURE 5. Even though the block 39 has been shifted, the arrangement of the contact legs 41 and 42 is such that the current conducting element 40 still remains in engagement with the contact portion 33 of the member 28 and only with the finger 44 of the contact 46. In other words, even though the block 39 has been shifted, its electrical connections remain the same as they were prior to the shifting of the block. The block 39a, however, when shifted to the position shown in FIGURE 5, now has its longer leg 42a of the current conducting element 40a bridging both of the contact fingers 44a and 45a, whereas the shorter leg 41a moves out of engagement with the member 28 and into engagement with the contact portion 36a of the member 28a. In other words, the circuit from the member 28 through the element 40a to the contact 44a has been broken and a new circuit is made from the contact member 28a through the element 40a to both of the contacts 44a and 45a. The significance of these circuits will be pointed out shortly.

Upon completion of the turn to the left, the steering post 1 will be rotated clockwise, whereupon engagement between the finger end 67a and one of the cams 2 will be effected, as is indicated in FIGURE 2. Upon continued clockwise rotation of the shaft 1, the finger 65a will be moved towards the abutment 68a, thereby taking up the space normally existing between these parts. When the arm 65a abuts the stop 68a, further clockwise rotation of the shaft 1 will exert a force on the actuating member 51 to rock it clockwise and return it to its neutral position. Should the lever 58 be held forcibly in its operating position so as to prevent return of the actuating member to its neutral position, the arm 65a may flex about the bent portion 66a so as to enable the end 67a to be cammed momentarily out of the path of the cam 2 and permit passage of the latter without breakage of any of the parts of the turn signal mechanism. Because of its resilience, the arm 65a will spring back to the position shown in FIGURE 2 upon passage of the cam so as to enable restoration of the parts to their neutral positions when the force holding the lever 58 is released.

When the actuating member 51 is returned to its neutral position, the switch blocks 39 and 39a will, of course, also be returned to their neutral positions. In this connection it is pointed out that the sizes of the blocks 39 and 39a are such that, in assembled condition, the looped end portions of the contact members 28 and 28a are somewhat compressed between the blocks and the hub 15 so that the contact portions of the members 28 and 28a are somewhat forcibly urged into engagement with the blocks 39 and 39a and urge the latter into somewhat forcible engagement with the contacts 44, 45, 44a and 45a. The force exerted by the looped portions of the members 28 and 28a, coupled with the sliding action of the blocks 39 and 39a, assures excellent wiping of the contact parts, thereby assuring long and trouble free operation of the switch.

The foregoing description has been confined to the operation of the apparatus when the parts are adjusted to indicate a left hand turn. It will be understood, however, that the mechanism will operate in a similar manner when the parts are set to indicate a right hand turn.

In FIGURE 9 is disclosed a schematic wiring diagram illustrating the manner in which the apparatus described hereinbefore may be incorporated in a vehicle electrical circuit. In a typical motor vehicle, there will be provided a right front parking or indicating lamp 70, a right rear stop lamp 71, a left front parking lamp 72 and a left rear stop lamp 73, the stop lamps being operable in response to the application of the brakes. The vehicle also will be provided with a source of continuous energy such as a battery 74 having one of its terminals connected to ground, e.g., the vehicle frame, through a wire 75. The other terminal of the battery is connected by the wire 25 to the contact post 24 through a normally open switch 76 which is adapted to be closed upon application of the vehicle brakes. When the switch is closed, electrical energy is supplied through the line 25 and the contact post 24 to the conducting element 28 to both of the current conducting legs 41 and 41a as long as the blocks 39 and 39a are in their neutral positions. Current supplied to the contacts 41 and 41a is conducted via contact legs 42 and 42a to the wires 48 and 48a leading to the rear stop lamps 71 and 73, respectively, to illuminate the latter and thus signal the application of the vehicle brakes. Thus, as long as the parts of the direction signalling apparatus are in their neutral positions, the brake actuated switch 76 is operable to illuminate both rear stop lights 71 and 73 in the conventional manner upon application of the vehicle brakes.

In the event it is desired to make a turn to the left, for example, the turn signal mechanism is set in the manner previously described so as to shift the blocks 39 and 39a to the positions shown in FIGURE 5. In these positions of the blocks, the current conducting element 40, although moved physically, will remain in contact with the element 28 and the contact 44 leading to the right rear lamp 71 so that a continuous supply of energy may be delivered to the right rear stop lamp upon the application of the vehicle brakes, but the contact element 40a will be shifted so that the leg 42a makes contact with both of the terminals 44a and 45a and the leg 41a makes contact with the current conducting element 28a. In these positions of the parts, current from the battery 74 will be delivered through the wire 27 to the contact post 26 through a current interrupter or flasher unit 77 of known construction so as to deliver current intermittently both to the left front lamp 72 and the left rear lamp 73 and cause these lamps to flash on and off to indicate a left hand turn. Since the contact element 40 remains in engagement with the element 28 when the mechanism is adjusted to indicate a turn to the left, there will be available a continuous source of current from the battery to the right rear stop lamp 71 upon the application of the brakes. When the turn has been completed, the switch blocks 39 and 39a will be returned to their neutral positions, thereby breaking the flasher circuit to the lamps 72 and 73.

The operation of the apparatus when making a right hand turn is similar to that described in connection with the making of a left hand turn, with the exception that the switch blocks 39 and 39a are shifted in opposite directions as has been explained hereinbefore.

If desired, one or more pilot lamps may be connected in the left- and right-hand circuits in a known manner so as to inform the vehicle operator of the operation of the signaling apparatus. Such pilot lamps are well known and do not form any part of the invention per se, so they need not be further described.

FIGURE 8 discloses a switch housing or case 85 which is generally similar to the case 13. The case 85 includes a recess 86 at the ends of which are slideably mounted a pair of carrier blocks 87 and 88. The blocks 87 and 88 are similar to the blocks 39 and 39a but differ from the latter in that they are of such length as to abut one side of the recess 86 when the blocks are in their normal or inactive positions as shown in FIGURE 8. Corresponding ends of the blocks 87 and 88 are recessed as at 89 and 90, respectively, for reception of one end of a coil spring element 91, 92, and the adjacent wall of the recess 86 is similarly recessed as at 93 and 94 for reception of the other ends of the springs. The springs urge their associated blocks into abutting engagement with the one side of the recess, but are sufficiently yieldable to permit movement of the blocks against the bias of the springs without the application of excessive force.

The blocks 87 and 88 are fitted with current conducting elements identical to the elements 40 and 40a, but it should be noted that the web 43 and 43a of each element passes under the associated block 87 and 88 for a reason which will appear subsequently.

The case 85 is fitted with parts identical to those previously described. Accordingly, parts which are the same in both embodiments are identified by the same reference characters and will not be described in detail.

The blocks 87 and 88 have an elongate slot 95 and 96, respectively, therein in which the associated actuating finger 57 and 57a is received. Each slot is so arranged as to have its end wall in engagement with the associated actuating finger so as to enable one block to be shifted upon movement of the actuating member 51 in a selected direction, but each slot is of such length that the other actuating finger is capable of moving freely without effecting movement of the other block. It is to enable free movement of the fingers 57 and 57a that both of the current carriers have their webs at the bottom of their associated blocks. Thus, if the actuating member 51 were operated to indicate a left hand turn, for example, the block 88 would be moved in its recess against the bias of the spring 92 in the same manner previously described, but the block 87 would remain stationary even though both fingers 57 and 57a move simultaneously. When the canceling mechanism returns the actuating member to its neutral position, the spring 92 will restore the block 88 to its neutral position.

The principal operating difference between the previously described embodiment and the embodiment shown in FIGURE 8 is that the movable current carrying elements of the latter construction do not move simultaneously in opposite directions. This avoids some wear of the parts. The principal structural difference between the two embodiments is the use of return springs in the FIGURE 8 construction. Even though springs are used, they are so arranged as to be independent of one another. Therefore, problems in balancing the forces of the springs are avoided.

The disclosed embodiments are representative of presently preferred forms of the invention, but are intended to be illustrative rather than definitive thereof. The invention is defined in the claims.

We claim:

1. Direction signaling apparatus for use with cam means movable in an orbital path, said apparatus comprising a support member; a molded, unitary actuating member having a body portion terminating at its ends in integral, flexible fingers adapted to project toward the path of said cam means; means mounting said actuating member on said support member for rocking movements about an axis intermediate the ends of said body portion from a neutral position to operating positions on opposite sides of said neutral positions; switch means; switch operating means integrally formed on said actuating member on opposite sides of said axis and connected to said switch means for operating said switch means in response to rocking of said actuating member; and means connected to said actuating member for rocking the latter from said neutral position to either of said operating positions.

2. Direction signaling apparatus for use with cam means movable in an orbital path, said apparatus comprising a support member; a molded, unitary actuating member having a body portion terminating at its ends in integral, flexible fingers adapted to project toward the path of said cam means; means mounting said actuating member on said support member for rocking movements about an axis intermediate the ends of said body portion from a neutral position to operating positions on opposite sides of said neutral positions; switch means; switch operating means integrally formed on said actuating member on opposite sides of said axis and connected to said switch means for operating said switch means in response to rocking of said actuating member; means connected to said actuating member for rocking the latter from said neutral position to either of said operating positions; first detent means on said support member; and second detent means integrally formed on said actuating member and engaging said first detent means for yieldably maintaining said actuating member in any one of its said positions.

3. Direction signaling apparatus for use with cam means movable in an orbital path, said apparatus comprising a molded, unitary actuating member having a body portion terminating at its ends in integral, flexible fingers adapted to project toward the path of said cam means; a switch casing member; means mounting said actuating member on said casing member for rocking movements about an axis passing through said casing member from a neutral position to operating positions on opposite sides of said neutral position; a pair of switch elements movably supported by said casing member on opposite sides of said axis; switch operating means integrally formed on said actuating member on opposite sides of said axis and connected to said switch elements for operating the latter in response to rocking movements of said actuating member; and means connected to said actuating member for rocking the latter from said neutral position to either of said operating positions.

4. Direction signaling apparatus for use with cam means movable in an orbital path, said apparatus comprising a molded, unitary actuating member having a body portion terminating at its ends in integral, flexible fingers adapted to project toward the path of said cam means; a switch casing member; means mounting said actuating member on said casing member for rocking movements about an axis passing through said casing member from a neutral position to operating positions on opposite sides of said neutral position; a pair of switch elements movably supported by said casing member on opposite sides of said axis; switch operating means integrally formed on said actuating member on opposite sides of said axis and connected to said switch elements for operating the latter in response to rocking movements of said actuating member; means connected to said actuating member for rocking the latter from said neutral position to either of said operating positions; first detent means integrally formed on said actuating member; and second detent means on said casing member in engagement with said first detent means for yieldably holding said actuating member in any one of said positions.

5. The apparatus set forth in claim 4 wherein said second detent means is integrally formed on said casing member.

6. The apparatus set forth in claim 4 wherein said switch elements are slidably supported by said casing member for sliding movement simultaneously in opposite directions.

7. Direction signaling apparatus for use with cam means movable in an orbital path, said apparatus comprising a unitary, molded actuating member having a body portion terminating at its ends in integral, flexible fingers adapted to project toward the path of said cam means; a unitary, molded casing member; means mounting said actuating member between the ends of said body portion for rocking movements about an axis passing between the ends of said casing member from a neutral position to operating positions on opposite sides of said neutral position; first detent means integrally formed on said casing member adjacent its ends; second detent means integrally formed on said actuating member adjacent said first detent means and in engagement with the latter for yieldably holding said actuating member in any one of said positions; switch means mounted on said casing member on opposite sides of said axis; switch operating means integrally formed on said actuating member on opposite sides of said axis and connected to said switch means for operating the latter in response to rocking movements of said actuating member; and means connected to said operating member for rocking the latter from said neutral position to either of said operating positions.

8. Direction signaling apparatus for use with cam means supported for movement in an orbital path, said apparatus comprising a support; a molded, unitary actuating member having a body portion terminating at its ends in integral, flexible fingers projecting toward the path of said cam means; means intermediate the ends of said body portion mounting said actuating member on said support for rocking movements about an axis passing through said body portion; operating means connected to said actuating member for rocking the latter from a neutral position in which said fingers are out of the path of said cam means to operating positions on opposite sides of said neutral position, one of said fingers being in the path of said cam means for engagement therewith in either operating position of said actuating member; first detent means integrally formed on said actuating member; and second detent means carried by said support and in engagement with said first detent means, said first and second detent means being cooperable to yieldably hold said actuating member in any selected one of said positions.

9. Direction signaling apparatus for use with cam means supported for movement in an orbital path, said apparatus comprising a support member; a molded, unitary actuating member formed of electrically insulating material having a body portion terminating at opposite ends in integral, flexible fingers projecting from said body portion toward the path of said cam means; mounting means intermediate the ends of said body portion mounting said actuating member on said support member for rocking movements about an axis passing through said body portion from a neutral position to operating positions on opposite sides of said neutral position; operating means connected to said actuating member for rocking the latter to either of its operating positions from said neutral position, each of said fingers being out of the path of said cam means when said body member is in its neutral position but one being adapted to move into the path of said cam means for engagement thereby when said actuating member is rocked to either of its operating positions, engagement of either of said fingers with said cam means effecting movement of the engaged finger relative to said body member; and a pair of abutments formed integrally on said actuating member, one adjacent each of said fingers, and engageable by its associated finger in response to movement of the latter in one direction by said cam means, said abutments operating to limit movement of each of said fingers in one direction to enable it to transmit force to said actuating member to return the latter from either operating position to said neutral position.

References Cited in the file of this patent

UNITED STATES PATENTS

| | | |
|---|---|---|
| 2,656,426 | Dibelka | Oct. 20, 1953 |
| 2,728,825 | Lincoln et al. | Dec. 27, 1955 |
| 2,800,542 | Barcus et al. | July 23, 1957 |
| 2,802,075 | Spicer et al. | Aug. 6, 1957 |
| 2,812,396 | Hollins | Nov. 5, 1957 |
| 2,882,358 | Dryer | Apr. 14, 1959 |
| 2,902,556 | Dryer | Sept. 1, 1959 |